(12) United States Patent
Canova et al.

(10) Patent No.: US 6,775,161 B1
(45) Date of Patent: Aug. 10, 2004

(54) POWER SUPPLY CIRCUIT FOR AN ELECTRIC MOTOR AND CORRESPONDING CONTROL METHOD

(76) Inventors: Antonio Canova, Via Po 79/4, 52025 Montevarchi, Arezzo (IT); David Martini, Via Garibaldi 21, 52028 S. Giovanni Valdarno, Arezzo (IT)

( * ) Notice: Subject to any disclaimer, the term of this patent is extended or adjusted under 35 U.S.C. 154(b) by 73 days.

(21) Appl. No.: 10/030,025
(22) PCT Filed: Jun. 26, 2000
(86) PCT No.: PCT/IT00/00261
§ 371 (c)(1), (2), (4) Date: Jan. 2, 2002
(87) PCT Pub. No.: WO01/03283
PCT Pub. Date: Jan. 11, 2001

(30) Foreign Application Priority Data

Jul. 2, 1999 (EP) ............................................ 99830423

(51) Int. Cl.[7] ........................ H02M 7/5387; H02P 5/28
(52) U.S. Cl. ......................... 363/132; 363/98; 318/805
(58) Field of Search ............................... 363/16, 17, 97, 363/98, 131, 132; 323/212, 213, 217–219; 318/729, 731, 799, 801, 805, 806, 809, 812

(56) References Cited

U.S. PATENT DOCUMENTS

| | | | |
|---|---|---|---|
| 4,227,127 A | * 10/1980 | Fukaya et al. | ............... 388/821 |
| 4,347,474 A | 8/1982 | Brooks et al. | |
| 4,647,837 A | 3/1987 | Stemmler | |
| 5,187,420 A | * 2/1993 | Kajitani et al. | .............. 318/823 |
| 5,237,254 A | * 8/1993 | Guerin | ........................ 318/685 |
| 5,283,726 A | 2/1994 | Wilkerson | |
| 5,444,359 A | 8/1995 | Riggio | |
| 5,460,244 A | * 10/1995 | Tanahashi | .................... 187/293 |

FOREIGN PATENT DOCUMENTS

CH     679 704     3/1992     ............. G05F/1/44

* cited by examiner

Primary Examiner—Matthew V. Nguyen
(74) Attorney, Agent, or Firm—Waddey & Patterson; Mark J. Patterson

(57) ABSTRACT

A circuit for controlling the power supply voltage of an electric motor includes means for detecting the difference between a mains voltage and a reference voltage, and means for generating alternating correction voltage whose frequency is equal to the frequency of the mains voltage and which is phase-shifted with respect to the mains. The phase shift between the mains voltage and the correction voltage is proportional to the between the mains voltage and the reference voltage, and the correction voltage is added to the mains voltage.

20 Claims, 11 Drawing Sheets

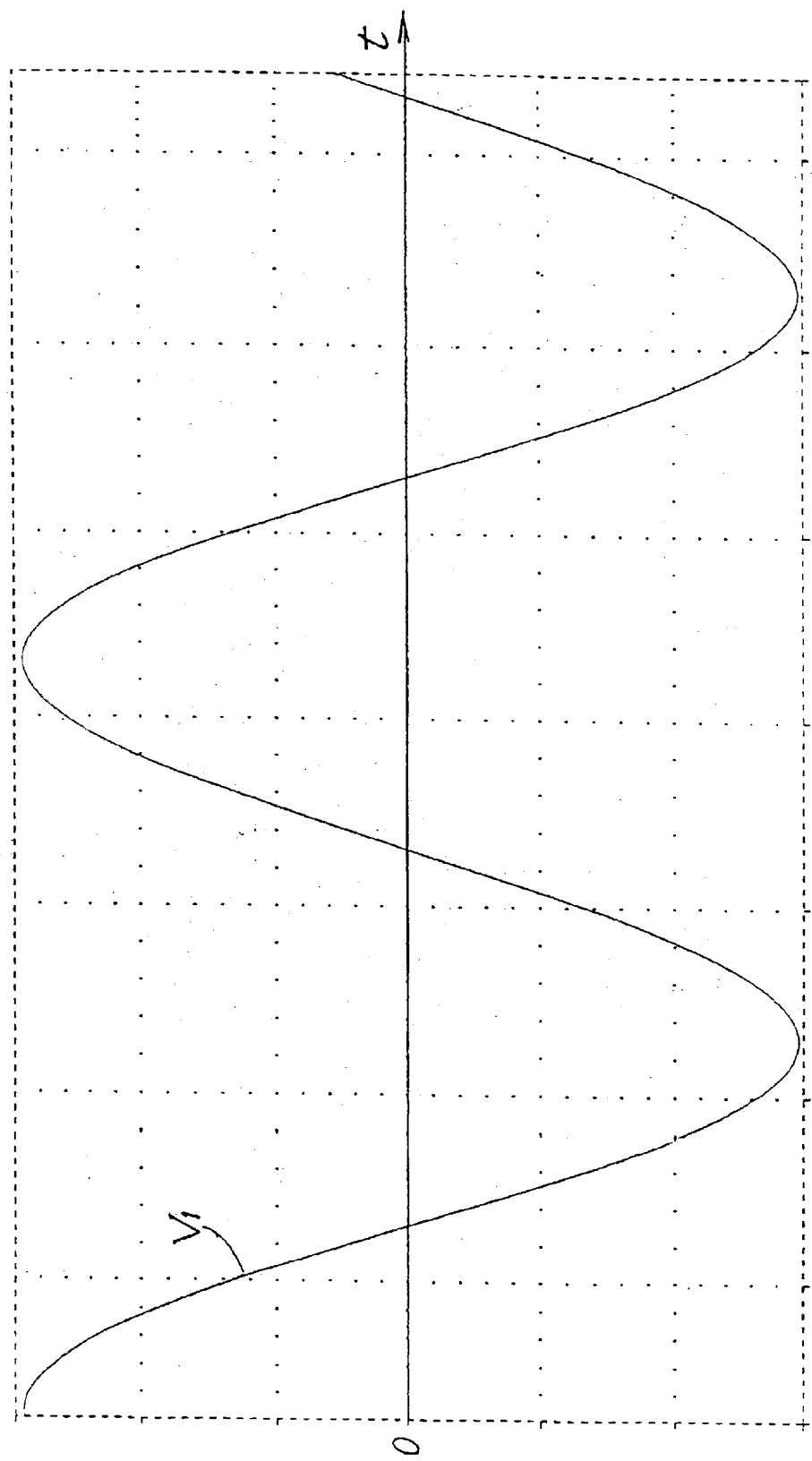

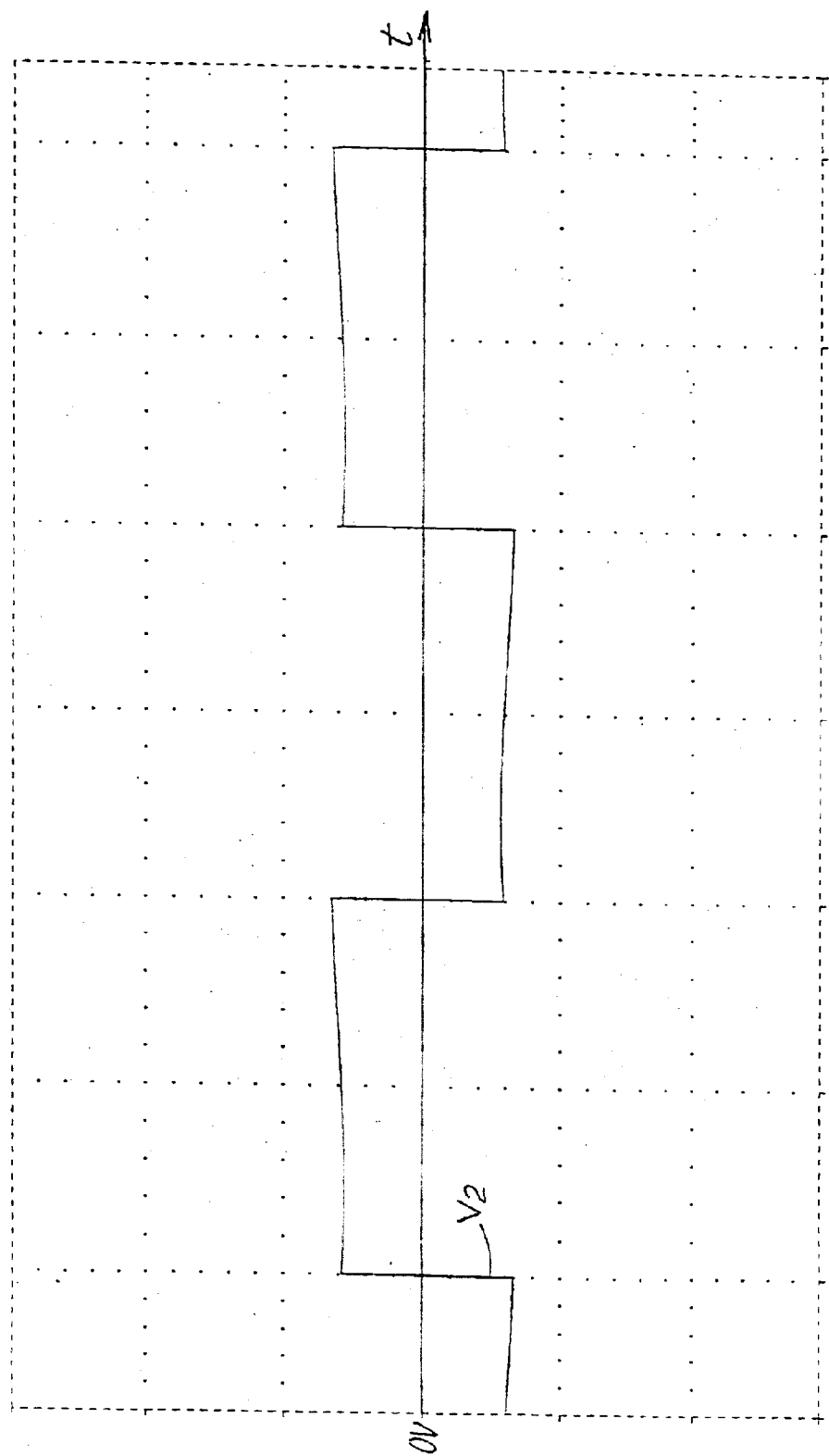

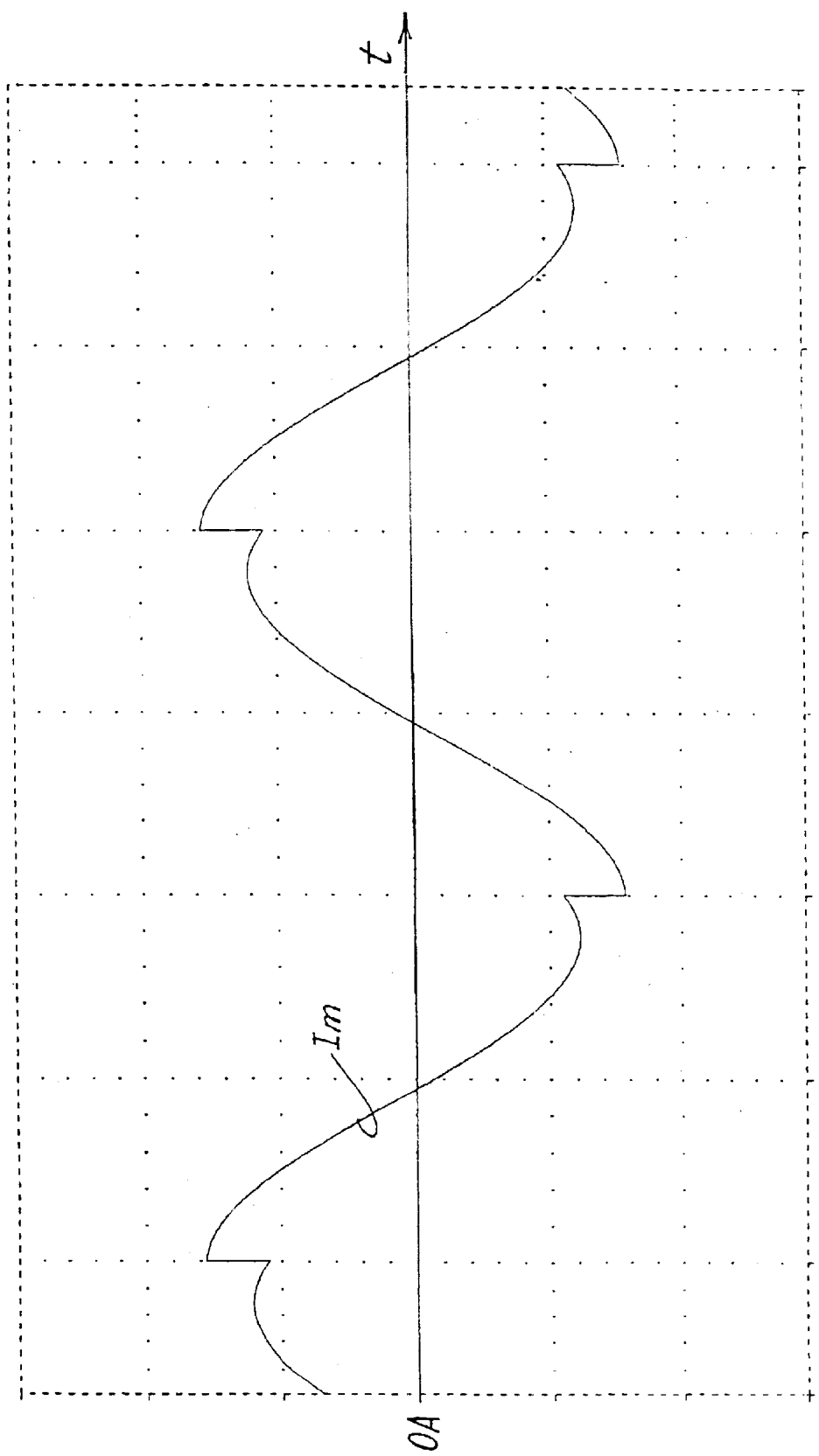

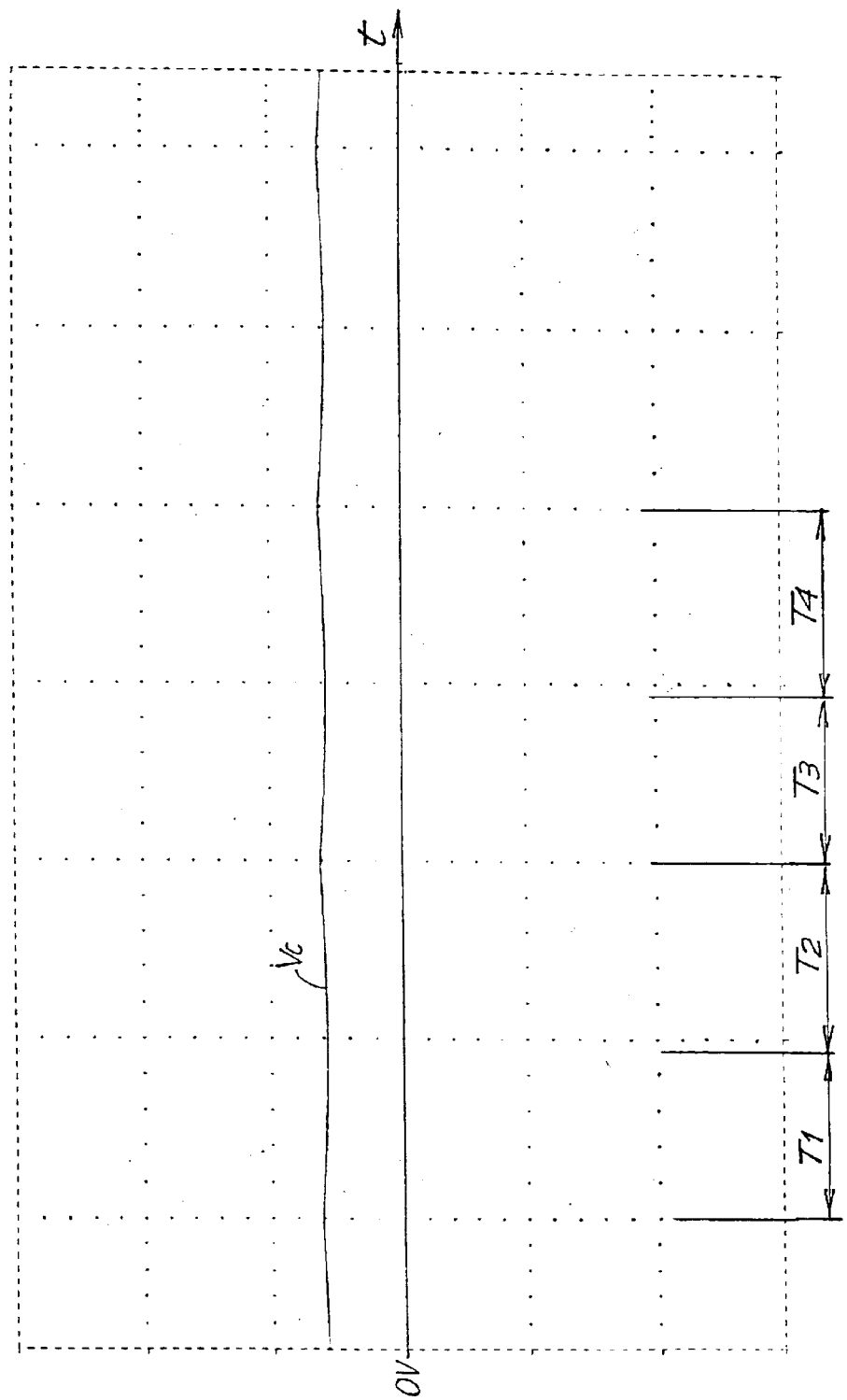

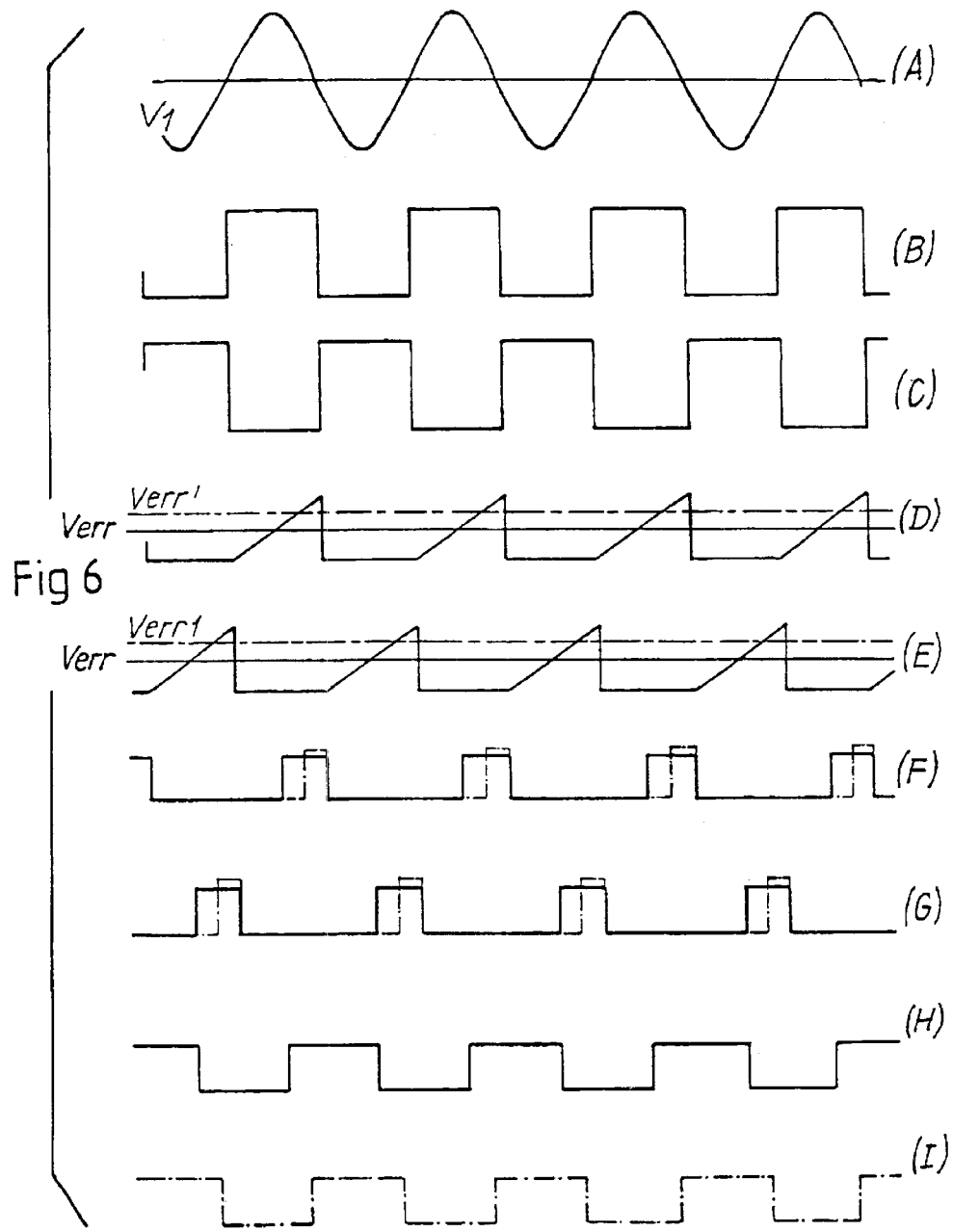

POWER SUPPLY CIRCUIT FOR AN ELECTRIC MOTOR AND CORRESPONDING CONTROL METHOD

TECHNICAL FIELD

The present invention relates to a power supply circuit of the stabilized, or at least regulated, voltage type, for an electric motor, for the purpose of maximizing the efficiency of the motor or of regulating its speed, particularly for an asynchronous electric motor, and especially—but not exclusively—a single-phase asynchronous motor.

The present invention also relates to an electric motor comprising a power supply circuit of the stabilized voltage type, as well as a method for controlling the supply voltage of an electric motor.

PRIOR ART

In the design of electric motors, it is assumed that the power supply is at a constant voltage, and the motor is designed with the object of optimizing the performance of the motor at the design voltage, typically ranging from 200 to 230 V, or having other values according to the mains voltage used in the country in which the motor is to be used.

In fact, the supply voltage is not constant, as a result of possible voltage fluctuations in the mains, and also as a result of small differences in voltage in the various mains systems of the individual countries in which the motor may be used. Typically, the mains voltage may be as much as 255 V. In order to enable a motor designed for a specific voltage to operate correctly in conditions where the voltage may vary by as much as several tens of volts, control circuits based on the principle of slicing, particularly triac and chopper control circuits, are used at present. These circuits have some disadvantages, including a high harmonic content of the supply voltage to the motor (particularly for triac controllers) and a high cost, owing to the necessity of using high-voltage components and complicated control circuits. The production of chopper control circuits also has the disadvantage of a certain structural complexity due to the necessity of using controlled switches which operate at a high frequency with respect to the mains frequency.

OBJECTS OF THE INVENTION

The object of the present invention is to provide a new type of control circuit for the power supply of a motor, particularly an asynchronous motor, which can be used to set or stabilize the supply voltage while avoiding the disadvantages of traditional slicing circuits.

A further object of the present invention is to provide a new method of controlling the power supply to an electric motor, particularly an asynchronous motor, which enables a stabilized supply voltage to be obtained without the disadvantages of the conventional methods.

More particularly, the object of the present invention is to provide a circuit and a control method which do not require expensive components, which avoid the use of high-frequency switching elements, and which do not require mains filters for the elimination of electromagnetic noise.

SUMMARY OF THE INVENTION

These and further objects and advantages, which the following text will make clear to a person skilled in the art, are essentially obtained by means of a circuit characterized in that it comprises means of measuring a difference between a mains voltage and a reference voltage, and means for generating an alternating correction voltage whose frequency is equal to the frequency of the mains voltage, and which is phase-shifted with respect to said mains voltage, the phase shift between the mains voltage and the correction voltage being proportional to the difference between the mains voltage and the reference voltage, and said correction voltage being added to the mains voltage.

Essentially, therefore, the invention Is based on the idea of subtracting from, or adding to, the mains voltage an alternating wave at low voltage (correction voltage), whose phase with respect to the mains voltage is controlled in such a way that the sum of the two voltages supplies a stabilized voltage to the motor.

In one practical embodiment, it is possible to generate the correction voltage by using a full bridge consisting of four controlled switches, whose switching generates the correction voltage, which in this case is a square-wave voltage. A control logic switches the controlled switches according to the difference between the mains voltage and the value of the stabilized voltage which is required for the motor. The bridge of controlled switches is connected, through a direct-current branch of the bridge, to a virtually continuous voltage source.

Although this virtually continuous voltage source may be a source supplied from the same mains voltage which has been suitably processed, in a particularly advantageous embodiment the continuous voltage is obtained by using the inductive energy of the motor. For this purpose, a storage device in which the inductive energy is stored during certain phases of the operating cycle, and transferred to the motor in the remaining phases, can be located in the direct-current branch of the bridge of controlled switches. In one practical embodiment, the storage device consists of a capacitor or a group of capacitors.

Further advantageous embodiments of the circuit according to the invention and of the corresponding motor, as well as of the motor power supply method, are indicated in the attached claims and will be described in greater detail below with reference to one embodiment.

BRIEF DESCRIPTION OF THE DRAWINGS

The invention will be more clearly understood from the description and the attached drawing, which shows a non-restrictive practical embodiment of the invention. More particularly, in the drawing.

FIGS. 5A–5E show the individual curves of FIG. 4 separately;

FIGS. 6A to 6l show the waveforms at the various points of the control logic.

DETAILED DESCRIPTION OF THE PREFERRED EMBODIMENT OF THE INVENTION

Figure 1:
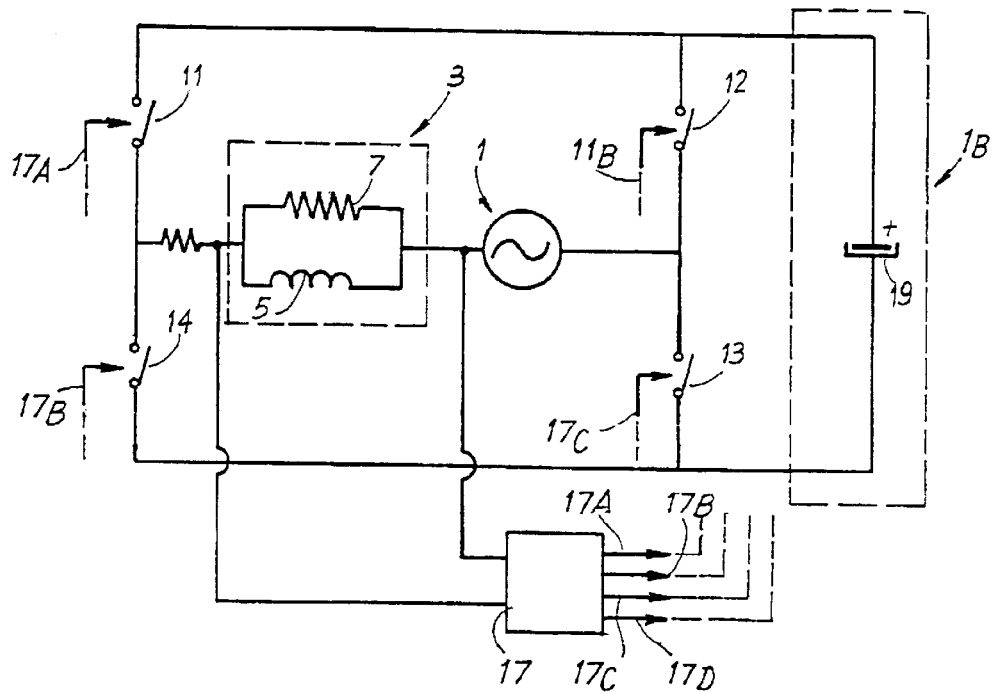
FIG. 1 shows a simplified diagram of the motor and of the corresponding supply voltage control circuit.

FIG. 1 shows schematically a constant-voltage power supply circuit for a single-phase asynchronous motor. The number 1 indicates the alternating voltage source, consisting, for example, of the electrical power mains, a generator unit, or another source. The number 3 indicates in a general way the motor which is represented schematically as an inductor 5 in parallel with a resistor 7.

The motor 3 and the voltage source 1 are connected in a full bridge consisting of controlled switches 11, 12, 13, 14, consisting for example of the same number of MOSFETs or other switching devices controlled by a control logic 17 whose outputs 17A–17D open and close the switches 11–14.

A direct-current branch 18 comprising a storage capacitor 19 is connected In parallel with the bridge 11–14. As will be made clear in the following description, the switching of the switches 11–14 is controlled by the control logic 17 according to the voltage across the terminals of the motor 3 and the phase of the supply voltage, in such a way as to generate a square-wave voltage which has a frequency equal to the frequency of the supply voltage supplied by the source 1, but is phase-shifted with respect to the latter, and which is added to or subtracted from the supply voltage to produce a voltage equal to the desired voltage across the terminals of the stator winding of the motor 3. The control logic modifies the phase of the square wave with respect to the phase of the supply voltage supplied by the source 1, to produce a voltage equal to the desired voltage across the terminals of the motor. The necessary voltage for the supply of the bridge 11–14 for generating the square wave is obtained by storing in the capacitor 19 some of the inductive energy of the motor 3.

The operation of the circuit described briefly above will be explained with reference to the diagrams in FIGS. 4, 5A-5D and FIGS. 3A-3D. FIG. 4 shows the following curves superimposed on each other:

V1: mains voltage supplied by the voltage source 1;

V2: square-wave voltage supplied by the full bridge 11, 12, 13, 14, supplied from the energy stored in the capacitor 19;

Vm: voltage across the terminals of the motor 3 (voltage across the winding);

Im: current passing through the motor 3;

Vc: voltage across the terminals of the storage capacitor 19.

For greater clarity, the five aforesaid curves are shown once again, separately from each other, in the diagrams in FIGS. 5A-5E.

As shown in FIG. 4, the voltage V2 applied to the motor by the bridge 11–14 is a square-wave voltage with a frequency equal to the frequency of the supply voltage VI, but phase-shifted with respect to it. The voltage Vm across the motor is the algebraic sum of the two voltages VI and V2. The phase shift between the voltages V1 and V2 is obtained by operating the controlled switches 11–14 of the full bridge and is controlled in such a way that it always supplies the motor 3 at a design voltage, independently of the voltage of the source 1. In the diagram in FIG. 4, it will be seen that the mains voltage V1 is greater than the motor supply voltage Vm. In practice, it is advantageous to make the control circuit impart a phase to the voltage V2 such that there is always a subtraction from the mains voltage V1, although, as will be clear to a person skilled in the art, the circuit can also operate in the opposite way. This means that the motor is designed for a rated voltage value Vm which is lower than the minimum value which can be supplied by the mains. For example, for a motor suitable for operation in a voltage range of 210–240 V, the design voltage of the motor will be equal to or less than 210 V.

If the mains voltage V1 varies for any reason, the control logic 17 will modify the switching phase of the switches 11, 12, 13 and 14 in such a way as to phase-shift the square-wave voltage V2 in a different way with respect to the mains voltage V1 to keep the sum Vm of the two voltages equal to the design value of the motor.

The diagram in FIG. 4 shows four time intervals T1, T2, T3 and T4 which correspond to the four states assumed in sequence by the control circuit in FIG. 1, according to the direction of flow of the current supplied by the voltage source 1 and the states of opening and closing of the switches 11, 12, 13, 14 of the full bridge. FIGS. 3A-3D show the switching conditions of the switches and the direction of flow of the current in the circuit for each of the four intervals T1–T4.

Figure 3A:
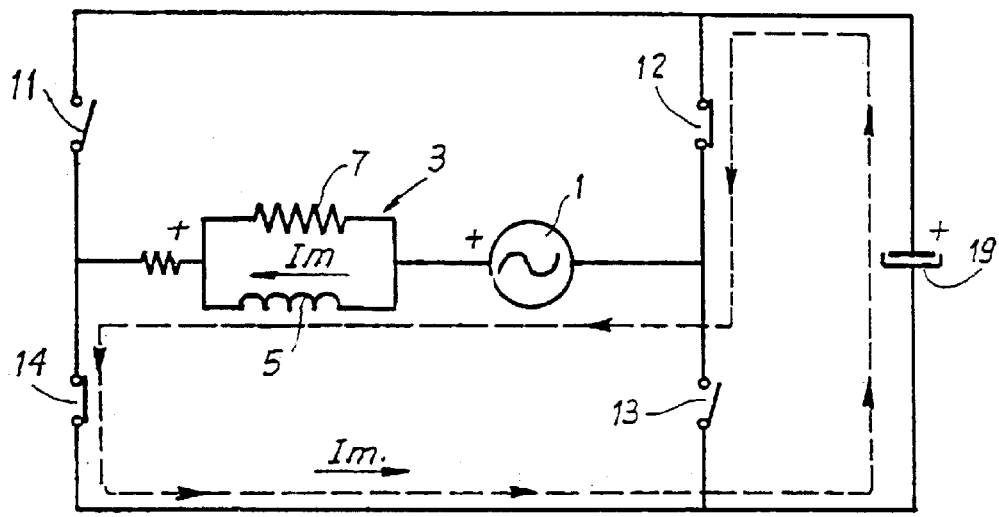
FIGS. 3A to 3D show the diagram of the motor and of the corresponding control circuit in four successive stages of operation.
Figure 3B:
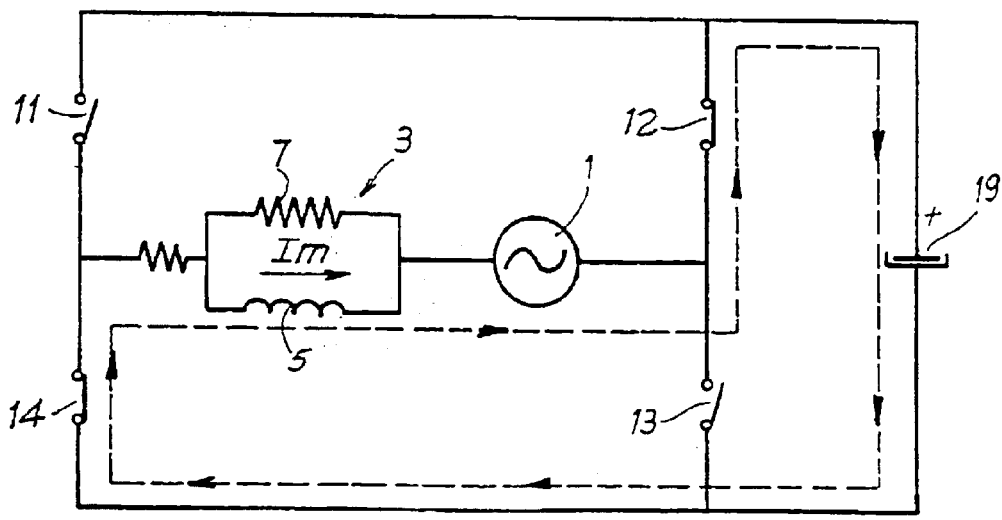
Figure 3C:
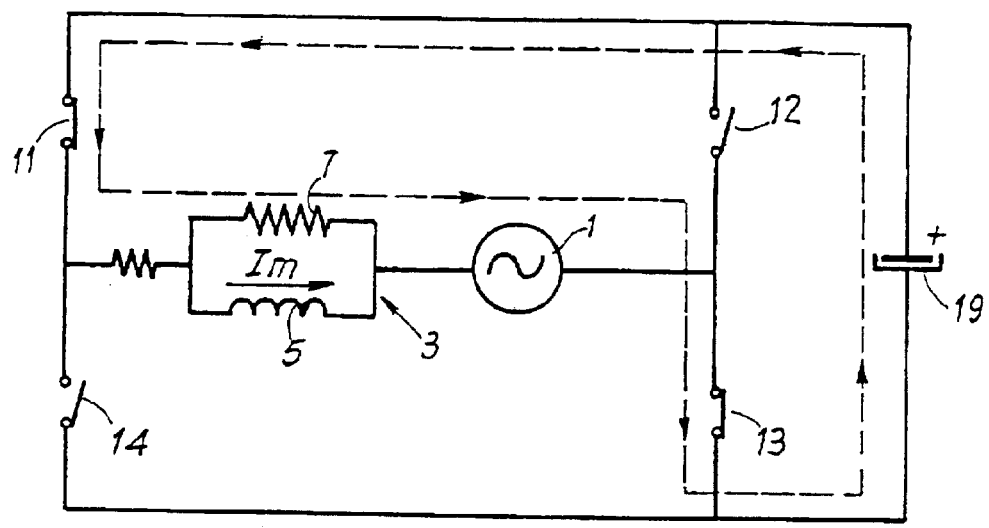
Figure 3D:
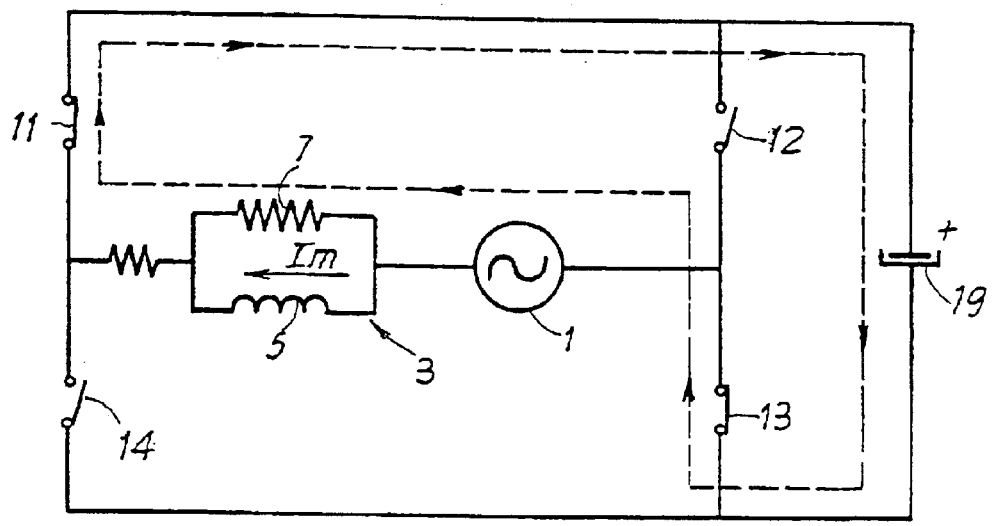
Figure 4:
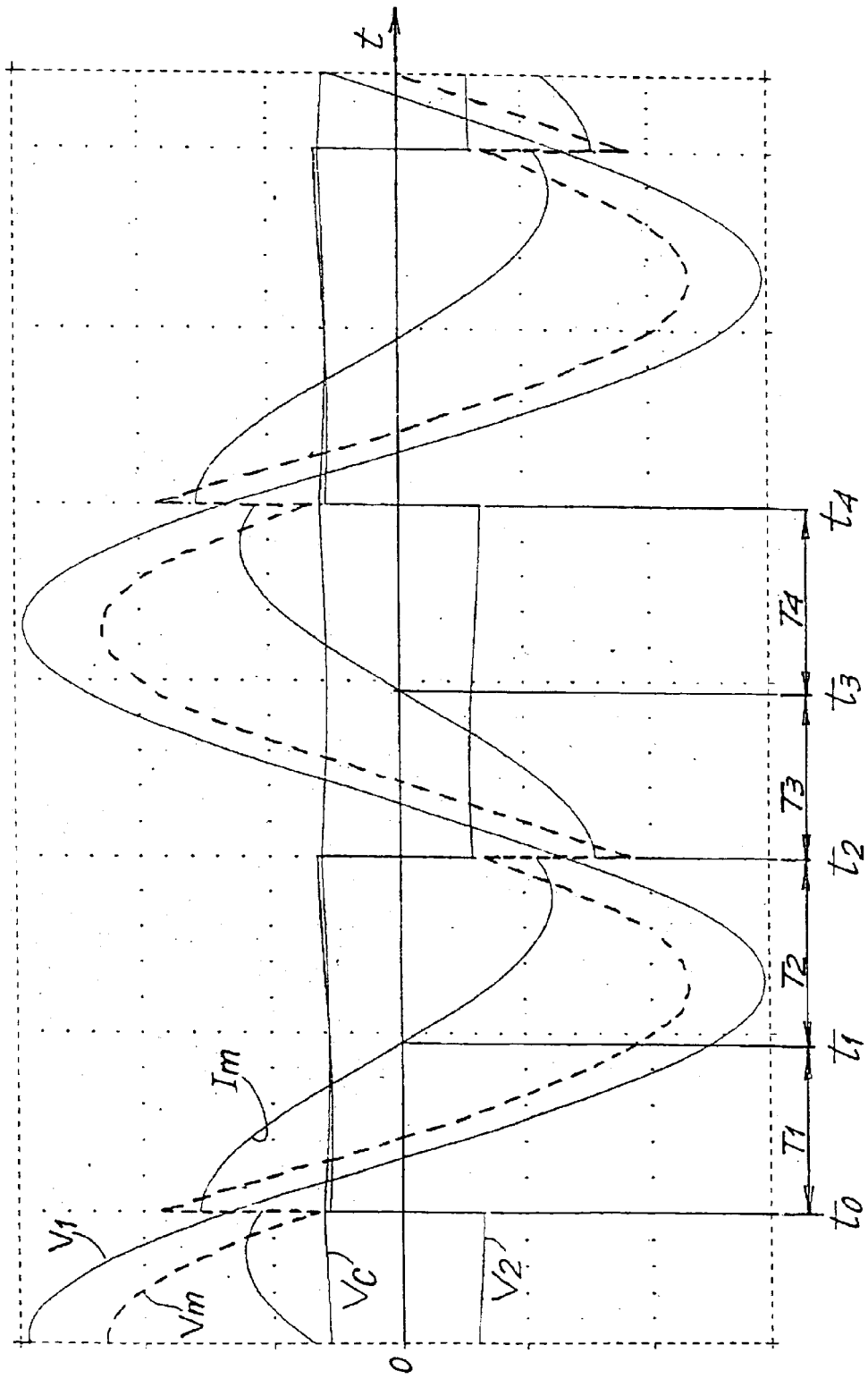
FIG. 4 shows a diagram of the mains voltage, the motor supply voltage, the motor supply current, the voltage of the storage capacitor and the control voltage.
Figure 5C:
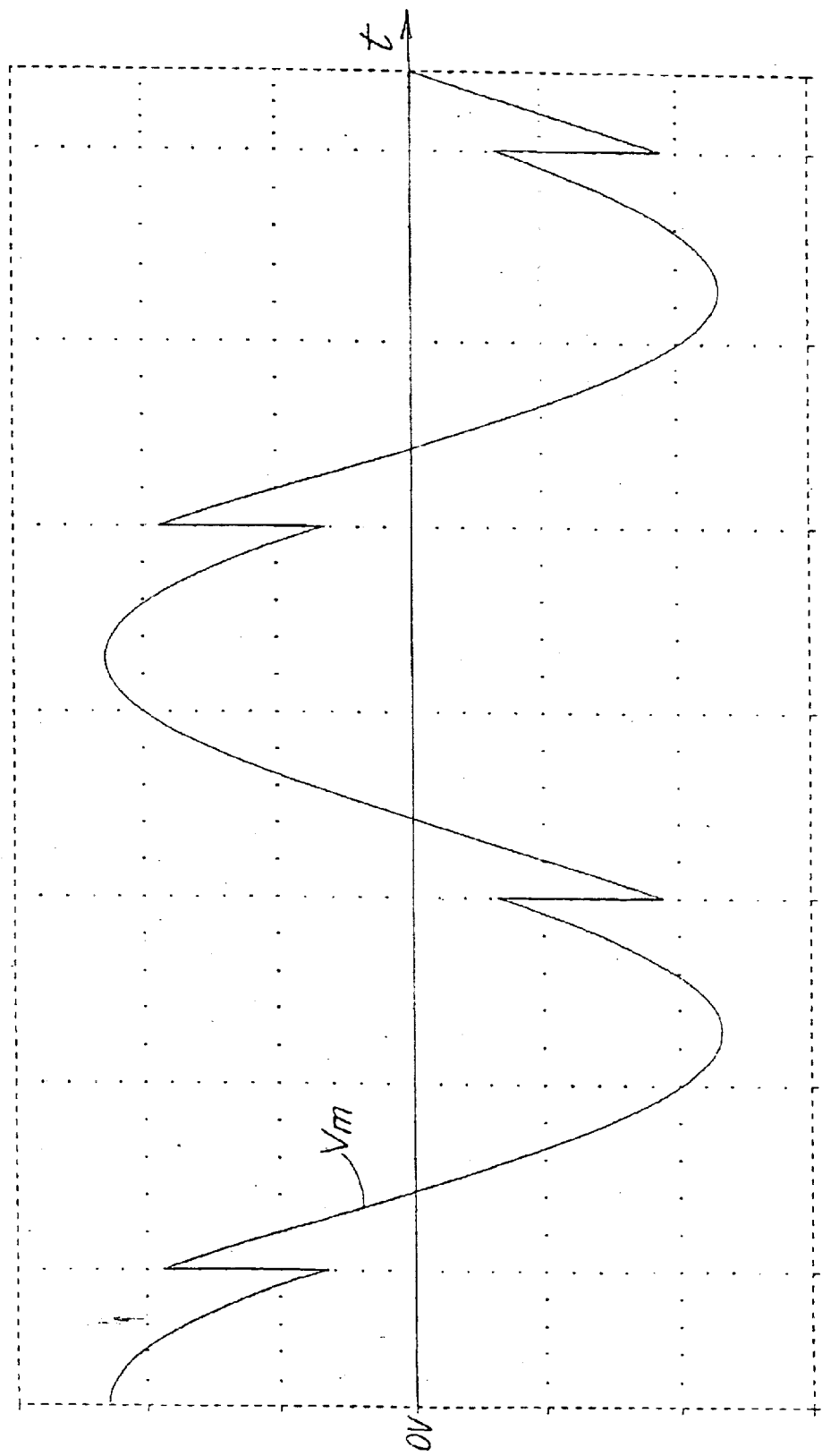

FIG. 3A shows the power supply circuit of the motor 3 during the interval T1 which starts at the instant (t0) at which the switches 11–14 of the bridge are switched and the voltage V1 is positive. Switches 11, 13 are open (OFF state), while switches 12 and 14 are closed (ON state). In the first part of the period T1, the polarity of the capacitor 19 matches the polarity of the voltage source 1, so that the voltage V2 across the terminals of the capacitor 19 is added to the mains voltage V1. The capacitor 19 discharges, supplying current to the motor 3. This is reflected in a slight decrease of the voltage Vc across the terminals of the capacitor in the interval T1 (see also FIG. 5E). However, the capacitance of the capacitor 19 is such that this voltage variation is minimized.

The current Im in the motor has a sinusoidal variation which is phase-shifted with respect to the variation of the mains voltage V1 and, at the end of the interval T1 (at the instant t1), it passes through the zero value, changing the direction of flow. At the instant ti, the circuit assumes the configuration in FIG. 3B, which is maintained for the time interval T2 (t2–t1): the current Im flows through the capacitor 19 in a direction such that it is charged, as may be seen from the slightly increasing trend of the voltage Vc (see also FIG. 5E) in the interval T2 and energy, in the form of the reactive energy of the motor 3, is stored In the capacitor 19.

At the instant t2, determined by the control logic 17 of the circuit in the way described later on, the switches 11, 12, 13 and 14 of the bridge are switched: switches 11, 13 are closed (ON state) and switches 12, 14 are opened (OFF state), while the current Im in the motor continues to flow in the same direction. The circuit assumes the configuration in FIG. 3C. The voltage applied by the bridge changes sign and becomes negative. The current in the capacitor 19 now flows in such a direction that energy is transferred from the capacitor to the motor, discharging the capacitor (the curve Vc is descending slightly).

At the instant t3, the current Im passes through the zero value and again changes its direction of flow. The circuit assumes the configuration in FIG. 3D: the reactive energy of the motor is transferred to the capacitor 19, which is charged. This state persists up to the next switching of the bridge 11, 12, 13, 14 at the instant t4, at which an operating cycle identical to that described recommences, starting from the instant of switching of the switches 11,12,13, 14.

As may be seen in FIG. 4, the instants of switching of the bridge 11, 12, 13, 14, which determine the phase of the square wave V2 with respect to the mains voltage V1, are delayed in such a way that the voltage V2 which is added algebraically to the voltage VI maintains a voltage across the terminals of the stator winding of the motor 3 which is less than the mains voltage. This is on the assumption that the motor has been designed for a rated voltage lower that the mains voltage, for example on the assumption that the design voltage is 210 V and the mains voltage is 230V. If the mains voltage V1 undergoes a change, the control logic 17 modifies the phase of the square-wave voltage V2 in such a way that the design voltage of 210 V is still produced across the terminals of the stator winding of the motor. Similar behaviour can take place if the design voltage is greater than the mains voltage, in which case the phase of the square wave V2 will be selected in such a way as to increase the voltage across the terminals of the motor with respect to the mains voltage.

The full bridge 11, 12, 13, 14 is caused to switch by finding the phase of the mains voltage V1 and the value of the voltage across the terminals of the motor 3, and then switching the switches 11, 12, 13, 14 in such a way as to obtain the desired phase for the square wave V2 so that the voltage to the motor remains at the desired value.

Figure 2:
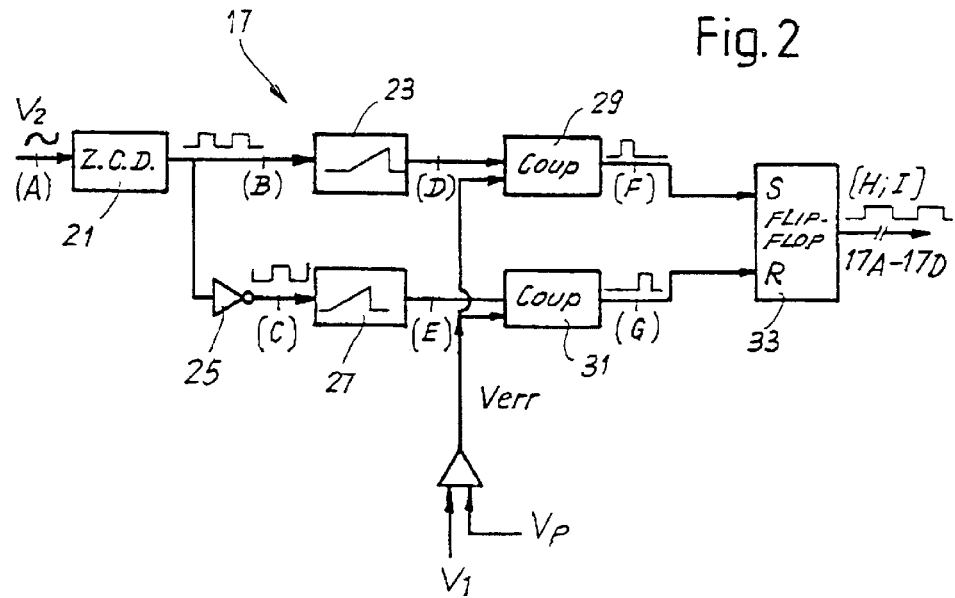
FIG. 2 shows a block diagram of the control logic.

The control logic 17 which causes the switching of the bridge 11, 12, 13, 14 may have the configuration shown in FIG. 2. The waveforms of the various signals in the control logic 17 are reproduced in FIGS. 6A–6I.

A signal corresponding to the mains voltage V1, whose variation is represented in FIG. 6A, is applied to the input of a zero-crossing detector 21. At the output of the detector 21 there is a periodic signal (see FIG. 6B) in phase with the mains voltage V1, which is sent to the input of a first ramp generator 23. The signal at the output of the detector 21 is also sent to an inverter 25, at whose output is obtained a signal which is inverted with respect to the output signal of the detector 21 (FIG. 6C), and which is sent to the input of a second ramp generator 27. Two identical waveforms, one in phase with the mains voltage V1 and the other phase-shifted by 90° with respect to it, as shown in FIGS. 6D and 6E, are obtained at the outputs of the two ramp generators. The two signals at the outputs of the ramp generators 23, 27 are sent to a first input of two corresponding comparators 29, 31, to whose second input is applied an error voltage (Verr) proportional to the difference between the design voltage of the motor (Vp) and the mains voltage (V1).

A square wave having a rising front coinciding with the point of intersection of each ramp with the error voltage Verr, and having a descending front coinciding with the descending front of each ramp, is obtained at the output of the first comparator 29. The output signal of the comparator 29 is shown in FIG. 6F in solid lines. A signal which is similar, but phase-shifted by 90°, is obtained at the output of the comparator 31 (FIG. 6G; signal shown in solid lines).

When the two output signals of the two comparators 29, 31 are sent to the set and reset inputs of a flip-flop 33, a square-wave signal is obtained at the output of the latter for switching the switches of the full bridge 11, 12, 13, 14, this signal having a duty cycle of 50% and a phase, with respect to the mains voltage V1, which is a function of the value of the error voltage Verr, since the position of the rising front of the two output signals of the comparator 29, 31 depends on this error voltage. The output signal of the flip-flop 33 in the presence of an error voltage Verr is shown in FIG. 6H.

FIGS. 6D to 6I also show how the phase of the switching signal generated by the flip-flop 33 varies with a variation of the error voltage. FIGS. 6D and 6E show in broken lines a different value of the error voltage V'err, which causes the generation of output signals of the comparators 29, 31 indicated in broken lines In FIGS. 6F and 6G. These two signals, applied to the set and reset inputs of the flip-flop 33, generate the switching signal indicated In FIG. 6I. This last signal has the same frequency as the signal in FIG. 6H, but is phase-shifted with respect to it.

Figure 7:
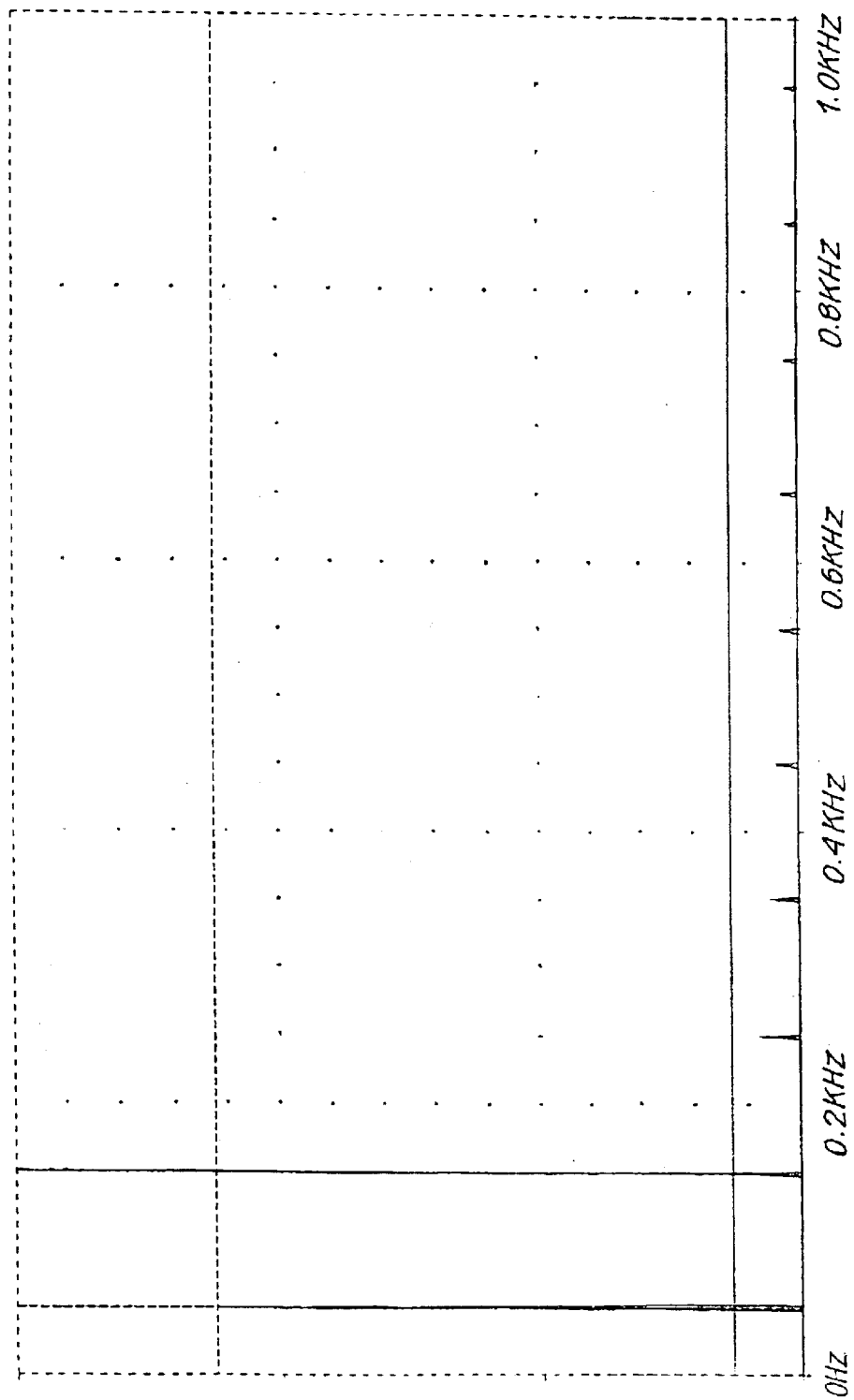
FIG. 7 shows the harmonic content of the voltage to the motor.

FIG. 7 shows the spectrum of the harmonic content of the voltage applied to the motor. As shown in the diagram, the harmonics of the base signal at 50 Hz are negligible, with considerable advantages over the situation which occurs when the voltage is controlled by triac slicers.

It is to be understood that the drawing shows only one practical embodiment of the invention, which may vary in its forms and arrangements without departure from the scope of the concept on which the invention is based. The presence of any reference numbers in the following claims has the purpose of facilitating the reading of the claims in the light of the preceding description and the attached drawings, and does not limit the scope of protection of the claims.

What is claimed is:

1. A voltage control circuit for supplying a motor with its motor design voltage using a voltage source, comprising:

difference means for measuring a difference between a line voltage generated by the voltage source and the motor design voltage; and correction means for generating a correction voltage based on the difference between the line voltage and the motor design voltage that can be combined with the line voltage to produce the motor design voltage, and for combining the correction voltage with the line voltage to produce the motor design voltage;

wherein the line voltage has a line voltage frequency and a line voltage phase; and the correction voltage has a correction voltage frequency equal to the line voltage frequency and a correction voltage phase that is phase-shifted with respect to the line voltage phase in an amount proportional to the difference between the line voltage and the motor design voltage.

2. The voltage control circuit of claim 1, wherein:

the difference means generates an error voltage proportional to the difference between the line voltage and the motor design voltage;

the correction means includes a bridge switching signal means for generating a bridge-switching signal based on the error voltage; and the correction means generates the correction voltage based on the bridge switching signal.

3. The voltage control circuit of claim 2, wherein the bridge-switching signal is phase-shifted with respect to the line voltage phase based on the error voltage.

4. The voltage control circuit of claim 3, wherein the correction means includes:

a bridge circuit;

a bridge voltage source connected to the bridge circuit; and wherein the bridge-switching signal causes the bridge circuit to generate the correction voltage.

5. The voltage control circuit of claim 4, wherein the bridge voltage source includes storage means for storing inductive energy generated by the motor and supplying the stored inductive energy to the bridge circuit to generate the correction voltage.

6. The voltage control circuit of claim 5, wherein the correction voltage includes a square-wave voltage.

7. The voltage control circuit of claim 6, wherein the bridge circuit includes four switching devices.

8. The voltage control circuit of claim 7, wherein the storage means includes one or more capacitors.

9. The voltage control circuit of claim 8, wherein the bridge-switching signal has a 50% duty cycle.

10. The voltage control circuit of claim 9, wherein each switching device includes a MOSFET.

11. The voltage control circuit of claim 10, wherein the bridge switching signal means includes:
- a zero-crossing detector;
- an inverter connected to an output of the zero-crossing detector;
- a first ramp generator connected to the output of the zero-crossing detector;
- a second ramp generator connected to an output of the inverter;
- a first comparator connected to an output of the first ramp generator and connected to the error voltage;
- a second comparator connected to an output of the second ramp generator and connected to the error voltage; and
- a flip-flop connected to an output of the first comparator and an output of the second comparator.

12. A voltage control circuit, comprising:
- a difference circuit adapted to be connected to a motor design voltage and a voltage source; and
- a correction circuit connected to the difference circuit, the correction circuit including
- a bridge circuit adapted to be connected to the voltage source and a motor designed to operate at the motor design voltage,
- a bridge voltage source connected to the bridge circuit, and
- a bridge control circuit connected to the bridge circuit and the difference circuit, and adapted to be connected to the voltage source;
- the bridge voltage source includes a storage device;
- the storage device includes one or more capacitors;
- the bridge circuit includes four switching devices;
- each switching device includes a MOSFET; and
- wherein the bridge control circuit includes:
  - a zero-crossing detector;
  - an inverter connected to an output of the zero-crossing detector;
  - a first ramp generator connected to the output of the zero-crossing detector;
  - a second ramp generator connected to an output of the inverter;
  - a first comparator connected to an output of the first ramp generator and connected to the error voltage;
  - a second comparator connected to an output of the second ramp generator and connected to the error voltage; and
  - a flip-flop connected to an output of the first comparator and an output of the second comparator.

13. The voltage control circuit of claim 12, wherein the voltage control circuit is connected to the motor.

14. The voltage control circuit of claim 13, wherein the voltage control circuit is connected to the voltage source.

15. A method of supplying a motor with its motor design voltage using a voltage source, comprising the steps of:
- measuring a difference between a line voltage generated by the voltage source and the motor design voltage; and
- generating a correction voltage based on the difference between the line voltage and the motor design voltage that can be combined with the line voltage to produce the motor design voltage; and
- combining the correction voltage with the line voltage to produce the motor design voltage;

wherein:
- the line voltage has a line voltage frequency and a line voltage phase; and
- the step of generating a correction voltage includes the step of generating a correction voltage having a frequency equal to the line voltage frequency and a correction voltage phase that is phase-shifted with respect to the line voltage phase in an amount proportional to the difference between the line voltage and the motor design voltage.

16. The method of claim 15, wherein the step of generating a correction voltage includes the steps of:
- generating an error voltage proportional to the difference between the line voltage and the motor design voltage;
- generating a bridge-switching signal based on the error voltage; and
- generating the correction voltage based on the bridge-switching signal.

17. the method of claim 16, wherein the step of generating a bridge-switching signal include the step of generating a bridge-switching signal phase-shifted with respect to the line voltage phase based on the error voltage.

18. the method of claim 17, wherein the step of generating the correction voltage based on the bridge-switching signal includes the steps of:
- supplying energy to a bridge circuit using a bridge voltage source; and
- applying the bridge-switching signal to the bridge circuit thereby causing the bridge circuit to generate the correction voltage.

19. the method of claim 18, further comprising the step of supplying energy to the bridge voltage source using the motor.

20. the method of claim 19, wherein the step of generating a correction voltage includes the step of generating a square-wave voltage.

* * * * *